Patented Aug. 30, 1949

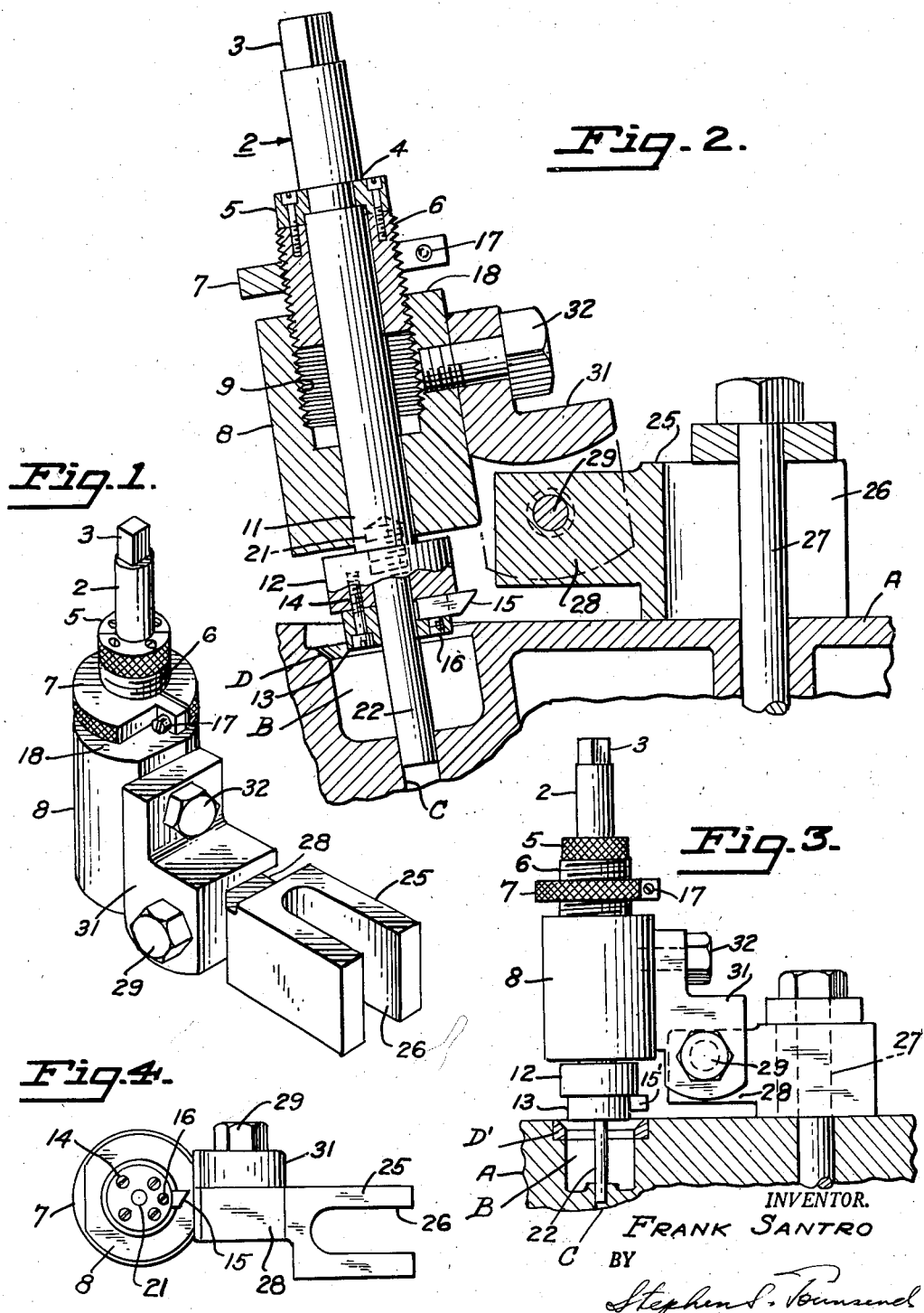

2,480,307

UNITED STATES PATENT OFFICE 2,480,307

CUTTING TOOL

Frank Santro, San Francisco, Calif.

Application December 26, 1946, Serial No. 718,548

1 Claim. (Cl. 90—12.5)

This invention relates to cutting tools, and more particularly to valve seat cutters, or the like.

One of the objects of the present invention is to provide a cutting tool adapted to cut valve seats in engine blocks, which are usually formed of extremely hard, tough metals. At the present time, it is the usual practice of mechanics to recondition valve seats in automotive vehicles, or the like, by means of grinding tools. The use of grinding tools is a slow and costly method of operation.

The present invention embraces a cutting tool, as distinguished from a grinding tool, to perform the operation of reconditioning a valve seat, or, alternatively, cutting a larger or deeper seat, if such is desired. The cutting tool herein described enables the user thereof to cut or recondition a valve seat far more rapidly, efficiently and accurately than was heretofore possible with known tools.

Again, it is an object of the present invention to provide a cutting tool for cutting valve seats, and wherein the tool may be clamped rigidly in position in order that it is aligned properly with the work to be cut and yet which provides for easy adjustment of the tool relative to the work.

Another object is to provide a valve seat cutter, which is easily adjustable with respect to the depth of cut and diameter of cut desired. A further object of this invention is to provide a valve seat cutting tool which is comparatively inexpensive to manufacture, easy to utilize, and rapid in operation and which is provided with an adjustable cutting head, wherein a plurality of different cutting bits may be easily affixed. Further objects and advantages will become apparent upon reference to the drawings and specification in which corresponding indicia represent corresponding parts in the several views.

In the drawings:

Fig. 1 is a perspective view of the cutting tool.

Fig. 2 is a cross sectional view of the cutting tool affixed to an engine block or head and indicating a valve seat, wherein the vertical axis thereof is disposed at an oblique angle to the top of the engine block or head to which the said tool is clamped.

Fig. 3 is a side elevational view of the cutting tool affixed to an engine block or head and wherein the vertical axis of the valve seat is disposed normal to the top of the engine block or head.

Fig. 4 is a bottom, plan view of the cutting tool.

I have illustrated the instant invention as applied to a conventional engine block or head A, having a valve port B, valve stem aperture C, and valve seat D, and wherein the vertical axis of the said valve seat and valve stem aperture is disposed at an oblique angle to the top of the engine block or head A to which the tool is clamped.

In Fig. 3 the vertical axis of the valve seat, illustrated as a valve seat insert D', and valve stem bore C is disposed normal to the top of the engine block or head A.

The cutting tool comprises a boring bar, indicated generally at 2, having a tool-engaging head, generally indicated at 3. The boring bar is provided with an annular shoulder 4 which rests against a collar 5, affixed to an exteriorly threaded sleeve 6 which carries an internally threaded split adjusting collar 7. The sleeve and attached collar are rotatable relative to said boring bar. The threaded sleeve 6 is threadably attached to an interiorly threaded well 9 formed in a main bearing housing 8. The boring bar is journaled in the bottom of the bearing housing 8, as at 11, and carries a cutter head 12, to which is attached a cutter head plate 13. It is to be noted that the boring bar is rigidly keyed to the cutter head 12 so that the said head will rotate with the boring bar. The cutter head plate 13 is removably attached to the cutter head 12 by means of suitable fastening devices, such as screws 14. A cutting bit 15, is provided in the cutter head in a slideway provided therein for that purpose, and an adjusting screw 16, provided in the cutter plate 13, and superposed over the slideway, may be utilized to fasten the bit 15 in place. If it is desired to utilize various sizes or shapes of bits 15, the cutter plate 13 and screw 16 may be loosened and a different bit inserted.

The split collar 7, which is threadably engaged to sleeve 6 and which may be moved vertically with respect thereto, is provided with a locking screw 17 in order that the said collar may be fastened to the sleeve in any desired position to prevent relative movement between said sleeve and said collar. The sleeve 7 functions as a means for adjusting the depth of vertical cut performed by the cutting tool. For example, if it is desired to cut a 1/1000 inch seat, the cutter bit is placed in position with respect to the work prior to cutting and in contact therewith and the sleeve 7 is moved to within 1/1000 inch of the flat shoulder 18 of main bearing housing 8 and locked there in position by means of screw 17. The boring bar is rotated and the desired depth of cut will be accomplished when collar 7 contacts shoulder 18. It is to be noted that the bore 21 is provided in the center of the cutter head for the reception of a centering stud 22 in order to align the tool with the valve seat by centering the stud 22 in valve stem aperture C, as illustrated in Fig. 2.

The means for clamping the present cutting tool to an engine comprises an anchor block 25 provided with a vertical slot 26, through which a suitable bolt 27 may be inserted in order to attach the same to an engine block, as indicated in Figs. 2 and 3. The longitudinal, vertical slot 26 allows for relative longitudinal movement of the tool relative to the position of the clamping bolt 27. The anchor block 25 includes a forwardly projecting, horizontally disposed stud portion 28 which is pivotally connected, by means of a bolt 29, to a link 31 in order to allow for relative tilting movement between link 31 and anchor block 25. The link 31 is connected to the main bearing housing 8, by means of a bolt 32, in order to allow for pivotal movement therebetween. Consequently, the cutting tool may be disposed at varying angles with respect to the point of anchored connection to an engine block and greatly facilitates positioning of the cutting head relative to work.

The present invention enables the user thereof to accomplish cutting and/or reconditioning of valve seats in hard metal engine blocks or cutting and/or reconditioning of valve seat insert portions at greatly increased tempo of production and insures increased accuracy because of the mounting mechanism provided therefor which allows flexibility of movement thereof.

It is to be noted that bolts 27, 29 and 32 are tightened when the work is in exact position to prevent unwanted movement of the tool relative to the work. Correspondingly, if it is desired to move the tool relative to the work, one or a plurality of said bolts may be loosened in order to enable movement of the tool.

The cutting bit 15 may be adjusted as to depth of lateral cut by means of adjusting screw 16 and/or adjusting screws 14, or, different tools of various sizes and shapes may be substituted selectively to be driven by the boring bar without necessity of substitution of the entire cutting tool assembly and complete repositioning of the clamping mechanism with respect to the work. Heretofore known valve seat conditioning tools were not adjustable with respect to the grinding means provided therefor. Fig. 3 illustrates a cutting bit 15' utilized for cutting valve seat insert D'.

While I have described my invention in more or less specific detail for purposes of clarity of illustration, example and description, it is to be understood that various changes, modifications and alterations may be practiced within the spirit of the invention and the scope of the appended claim.

I claim:

A cutting tool for valve seats comprising a work-clamping mechanism consisting of a work anchor block provided with an open-ended bolt receiving slot arranged for adjustable slidable attachment to a vertically disposed stud bolt projecting from the work, a link attached pivotally to said block and to a main bearing housing to permit said main bearing housing to be rocked about said pivotal attachment toward and away from said anchor block, said link attached pivotally to said main bearing housing to permit said housing to be rocked in a direction at right angles relative to the direction of rocking movement of said housing toward and away from said anchor block, a boring bar mounted rotatably in said bearing housing and extending therethrough, said boring bar having a tool-engaging portion at one end and carrying a cutter head on the opposite end, a sleeve mounted rotatably on said boring bar and attached threadably to said bearing housing, a split collar carried threadably by said sleeve and adapted to be locked in position relative thereto, a slideway in said cutter head, a cutting bit mounted in said slideway of said cutter head and projected laterally from said head, and means comprising said cutter head and a cutter plate attached removably to said head to allow for adjustment, removal and replacement of a cutting bit in said cutter head.

FRANK SANTRO.

REFERENCES CITED

The following references are of record in the file of this patent:

UNITED STATES PATENTS

| Number | Name | Date |
|---|---|---|
| 1,186,403 | Johnsen | June 6, 1916 |
| 1,787,871 | Moen | Jan. 6, 1931 |

FOREIGN PATENTS

| Number | Country | Date |
|---|---|---|
| 158,047 | Germany | Jan. 31, 1905 |
| 163,848 | Great Britain | June 2, 1921 |